United States Patent
Ogose et al.

(10) Patent No.: US 10,477,848 B2
(45) Date of Patent: Nov. 19, 2019

(54) SPOOL BRAKE DEVICE

(71) Applicant: Shimano Inc., Sakai, Osaka (JP)

(72) Inventors: Hiroki Ogose, Osaka (JP); Akira Niitsuma, Osaka (JP); Yuichiro Ishikawa, Osaka (JP)

(73) Assignee: SHIMANO INC., Sakai, Osaka (JP)

( * ) Notice: Subject to any disclaimer, the term of this patent is extended or adjusted under 35 U.S.C. 154(b) by 260 days.

(21) Appl. No.: 15/788,619

(22) Filed: Oct. 19, 2017

(65) Prior Publication Data

US 2018/0199554 A1 Jul. 19, 2018

(51) Int. Cl.
*A01K 89/01* (2006.01)
*A01K 89/0155* (2006.01)

(52) U.S. Cl.
CPC .............................. *A01K 89/01555* (2013.01)

(58) Field of Classification Search
CPC ................... A01K 89/0155; A01K 89/0182
See application file for complete search history.

(56) References Cited

U.S. PATENT DOCUMENTS

| | | | | |
|---|---|---|---|---|
| 5,318,245 A * | 6/1994 | Sato | .................... | A01K 89/0155 188/164 |
| 6,168,106 B1 * | 1/2001 | Cockerham | ...... | A01K 89/01557 242/289 |
| 6,860,443 B2 * | 3/2005 | Moosberg | .......... | A01K 89/0155 242/286 |
| 7,159,813 B2 * | 1/2007 | Ikuta | ................ | A01K 89/01555 242/288 |
| 7,648,096 B2 * | 1/2010 | Niitsuma | ......... | A01K 89/01555 242/286 |
| 2009/0173815 A1 * | 7/2009 | Lee | ..................... | A01K 89/0155 242/286 |
| 2013/0037645 A1 * | 2/2013 | Niitsuma | ......... | A01K 89/01555 242/288 |
| 2014/0332616 A1 * | 11/2014 | Niitsuma | ........... | A01K 89/0155 242/289 |
| 2019/0223421 A1 * | 7/2019 | Niitsuma | ......... | A01K 89/01555 |

FOREIGN PATENT DOCUMENTS

JP          20090159847          7/2009

* cited by examiner

*Primary Examiner* — Emmanuel M Marcelo
(74) *Attorney, Agent, or Firm* — Jeffer Mangels; Butler & Mitchell LLP; Brennan C. Swain, Esq.

(57) ABSTRACT

The spool brake device is equipped with a brake unit, a detector, and a controller. The controller controls the braking force by the brake unit based on the variation of the rotational speed of the spool detected by the detection unit. When the rotational speed is increasing, the controller controls the braking force by the brake unit in the regular braking mode. In the regular braking mode, the controller changes the braking force by the brake unit according to the rotational speed of the spool. In addition to it, when the rotational speed of the spool stops, the controller is to control the braking force by the brake unit in the first braking mode, during a period of predetermined time. In the first braking mode, the controller makes a braking force by the brake unit that is less than the braking force in the regular braking mode. In addition, after the predetermined time, the controller may make a braking force in a second braking mode by the braking unit that is less than the braking force in the first braking mode.

16 Claims, 7 Drawing Sheets

SPOOL BRAKE DEVICE

FIELD OF THE INVENTION

The present invention relates to a spool brake device for a dual bearing reel.

BACKGROUND OF THE INVENTION

Dual bearing reels typically have a spool brake device for braking the spool in order to prevent backlash during casting. For example, see Japanese Unexamined Patent Application Publication No. 5122273, which is incorporated by reference herein in its entirety.

SUMMARY OF THE PREFERRED EMBODIMENTS

A spool brake device according to an aspect of the present invention is configured to brake a spool of a dual bearing reel. This spool brake device includes a brake unit, a detector, and a controller. The brake unit brakes the spool. The detection unit detects the rotational speed of the spool. The controller is configured to control the braking force by the brake unit based on the rotational speed of the spool detected by the detector. When the rotational speed is lower than the predetermined rotational speed, the controller controls the braking force by the brake unit in the regular braking mode. In the regular braking mode, the controller changes the braking force by the brake unit in accordance with the rotational speed. Also, when the increase of the rotational speed is stopped, the controller controls the braking force by the braking unit in the first braking mode during the predetermined time. In the first braking mode, the controller makes the braking force smaller than the braking force in the regular braking mode.

In this composition, when the rotational speed of spool increases, backlash can be prevented at the time of casting, since the spool is braked in the regular braking mode. Also, when the increase of the rotational speed of spool is stopped, the flying distance of the lure can be improved at the time of casting, since change of mode from regular braking mode to first braking mode decreases the braking force by the braking unit. And in this composition, fishing line-break can be prevented at the time of casting.

Preferably, the detector has a speed sensor, speed comparator, and increase/decrease determinator. The speed sensor detects the rotational speed of the spool at each predetermined time interval. The speed comparator compares the rotational speed of the spool detected in the speed sensor with the rotational speed of the spool detected in the speed sensor right beforehand. The increase/decrease determinator judges the increase or decrease of the rotational speed of the spool based on the comparison result from speed comparator.

Preferably, the control unit controls the braking force by the braking part in the second braking force mode after the predetermined time passes. In the second braking force mode, the control unit makes the braking force by the braking part smaller than the braking force in the first braking mode. Preferably, in the second braking force mode, the control unit controls the braking force by braking part constantly.

According to this invention, a casting distance of a lure can be improved as well as preventing a backlash when casting. The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

It will be appreciated that terms such as "front," "back," "top," "bottom," "side," "short," "long," "up," "down," "left," "right" and "below" used herein are merely for ease of description and refer to the orientation of the components as shown in the figures. It should be understood that any orientation of the components described herein is within the scope of the present invention.

Figure 1:
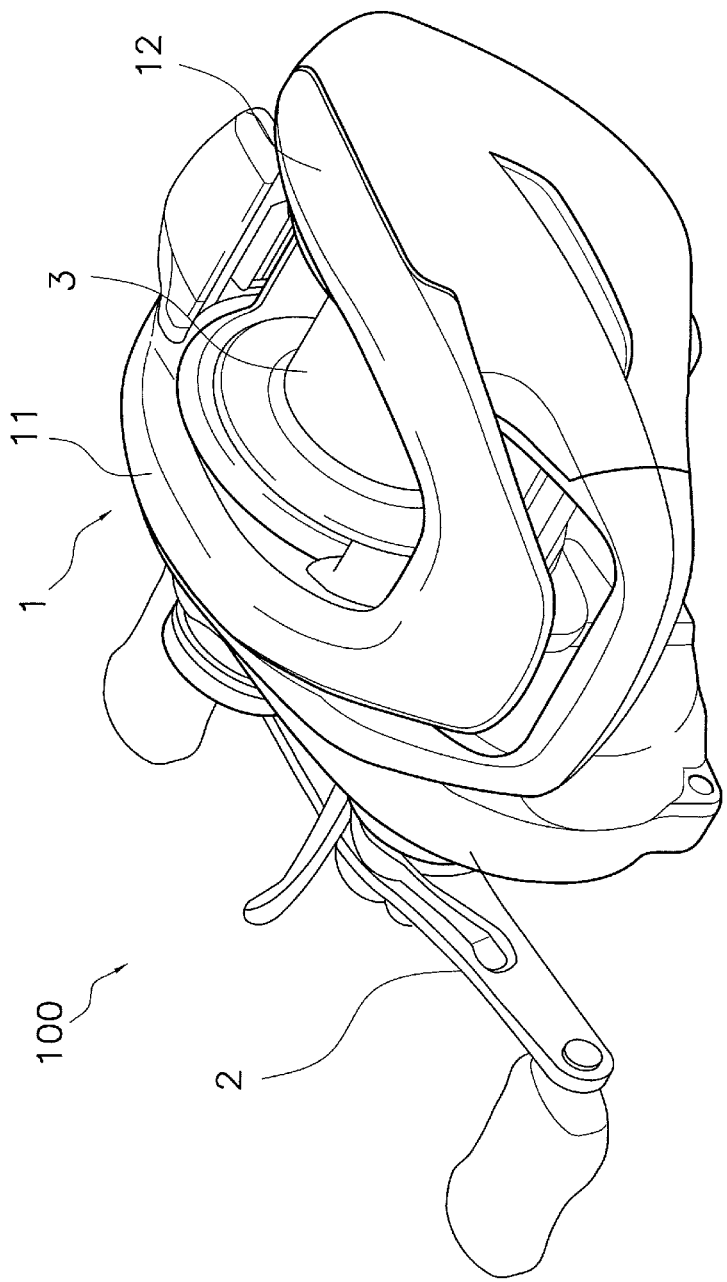
FIG. 1 is a perspective view of a dual bearing reel.
Figure 2:
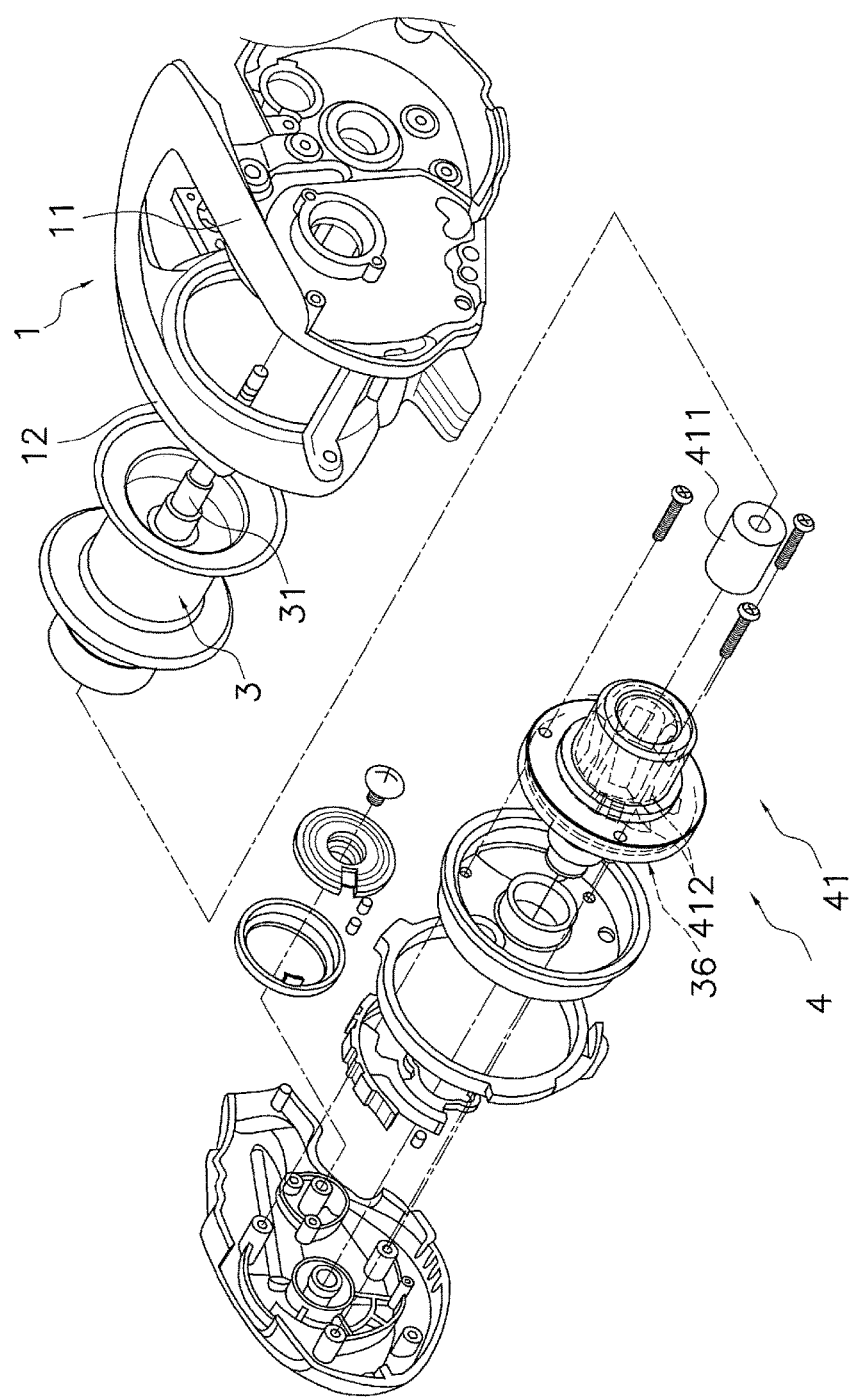
FIG. 2 is an exploded perspective view of a dual bearing reel.

Hereinafter, embodiments of a dual bearing reel in which a spool brake device according to the present invention is adopted is to be described with reference to the drawings. As shown in FIGS. 1 and 2, the dual bearing reel 100 includes a reel body 1, a handle 2, a spool 3, and a spool brake device 4.

The reel body 1 has a first reel body 11 and a second reel body 12. The first reel body 11 and the second reel body 12 are arranged at intervals from each other in the axial direction. The first reel body 11 accommodates a rotation transmission mechanism (not shown) for transmitting the rotation of the handle 2 to the spool 3.

The handle 2 is rotatably attached to the reel body 1. Specifically, the handle 2 is rotatably attached to the first reel body 11. The rotation of the handle 2 is to be transmitted to the spool 3 via the rotation transmission mechanism.

Spool 3 is supported by reel body 1 to be rotatable. Spool 3 is located between first reel body 11 and second reel body 12. In detail, spool 3 is installed on spool axis 31. Spool axis 31 expands between first reel body 11 and second reel body 12 axially. Spool axis 31 is supported by first reel body 11 and second reel body 12 to be rotatable.

Figure 3:
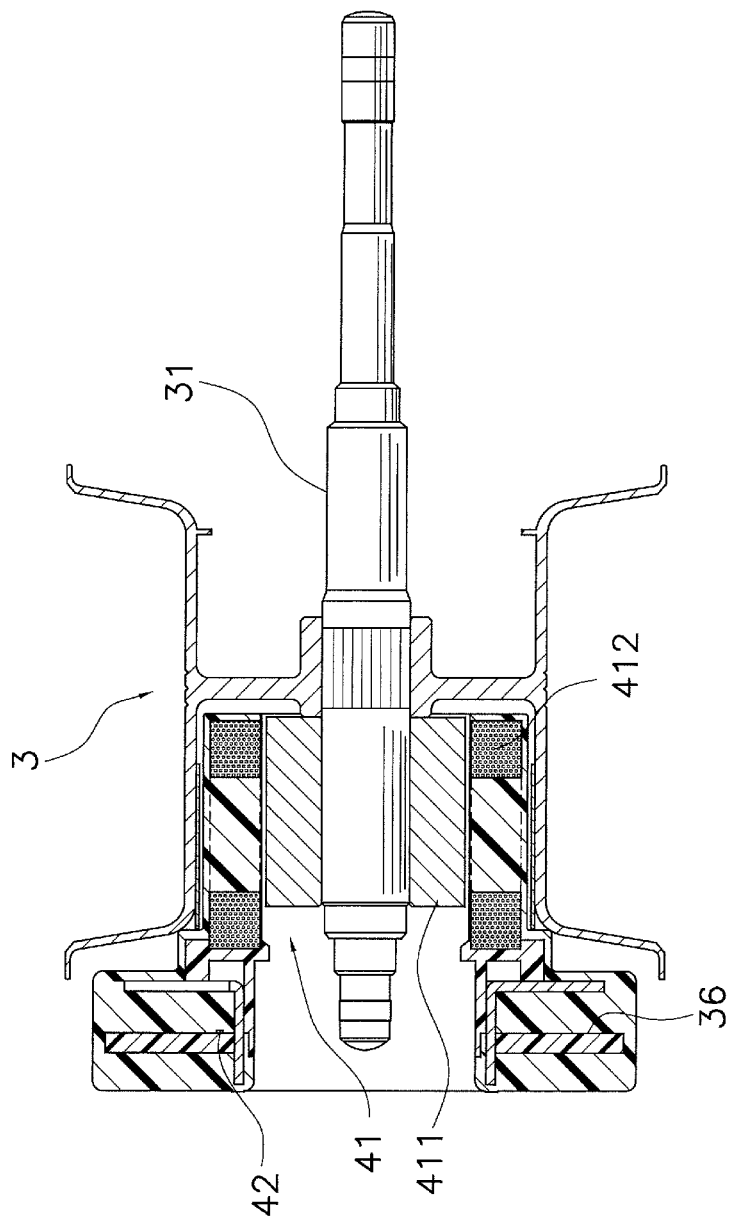
FIG. 3 is a cross section view of a brake unit.
Figure 4:
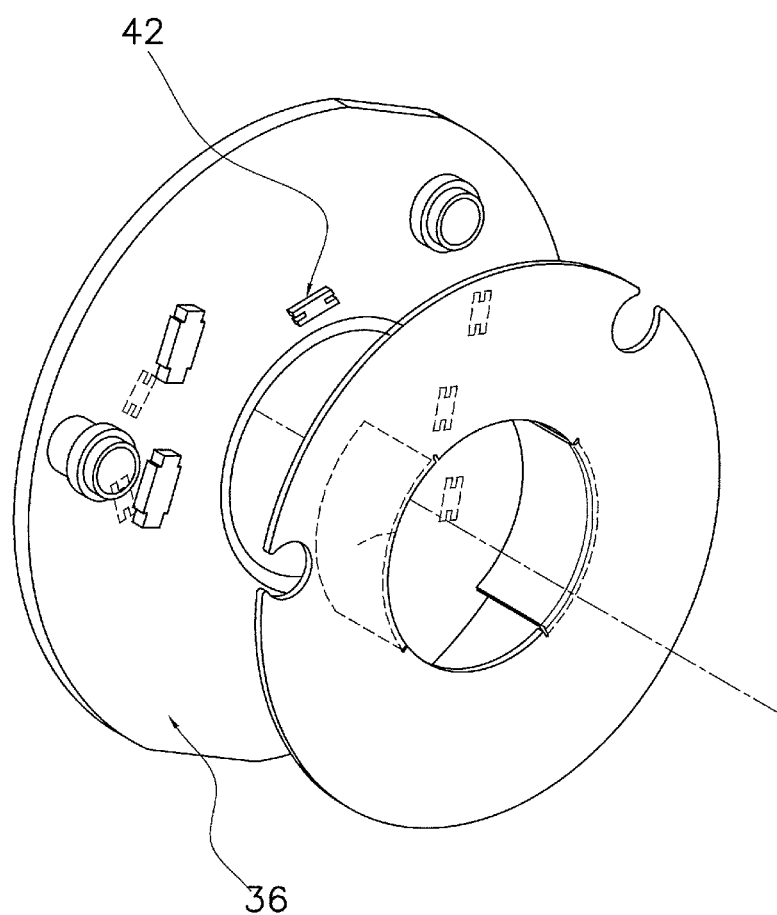
FIG. 4 is a perspective view of a circuit board to which a detection unit is attached.
Figure 5:
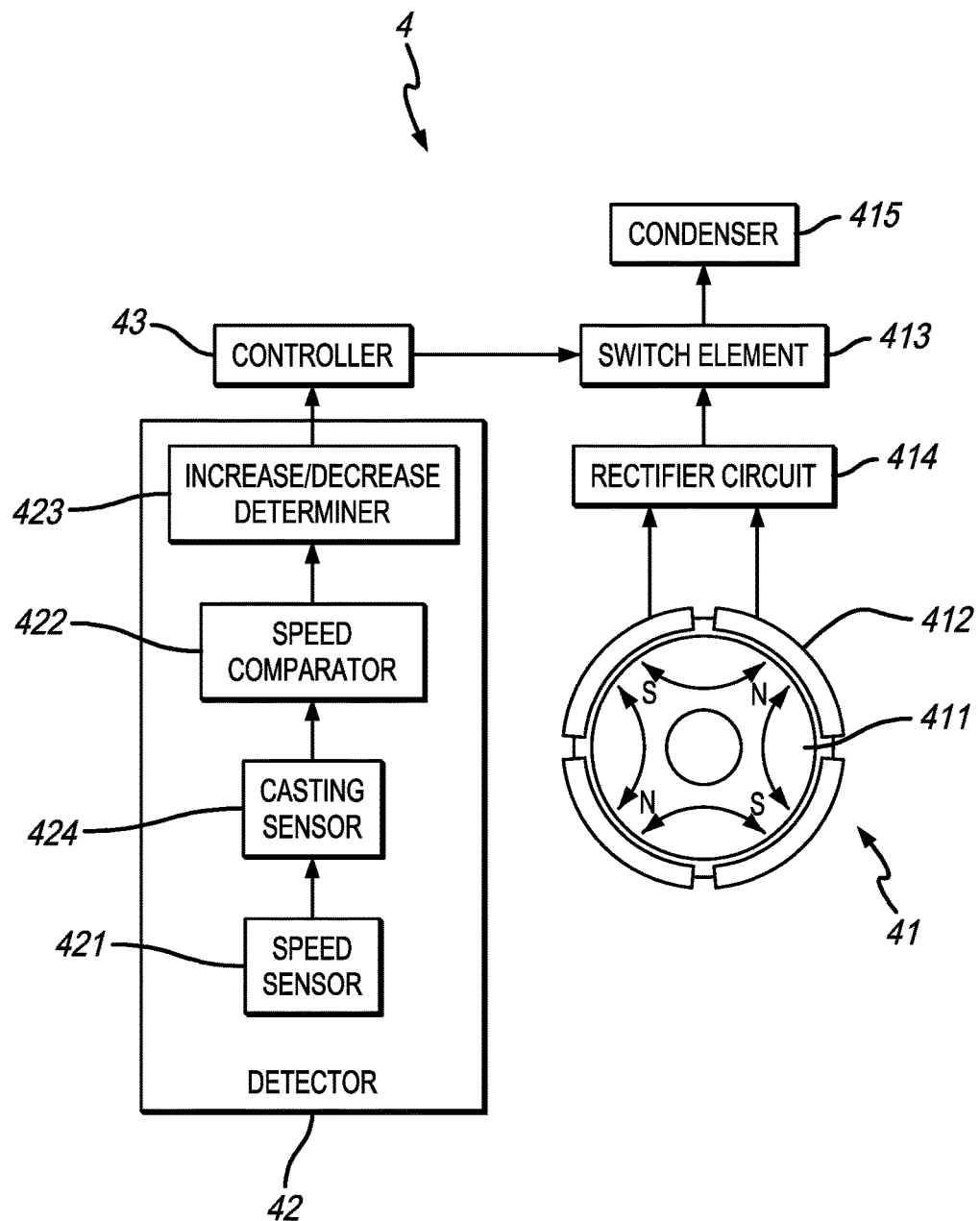
FIG. 5 is a block diagram of a spool brake device.

As shown in FIGS. 3-5, spool braking device 4 is configured to brake spool 3. This spool braking device 4 has braking unit 41, detector 42, and controller 43. In addition, part of composition of detector 42 and controller 43 is a CPU (Central Processing Unit). In other words, controller 43 is a functional composition implemented by software. In addition, controller 43 can be implemented by hardware such as electronic circuitry, and it may be implemented by cooperation of software and hardware.

The brake unit 41 is configured to brake the spool 3 by magnetic and electrical control. Specifically, the brake unit 41 includes a magnet 411, a plurality of coils 412, and a switch element 413. The magnet 411 rotates integrally with the spool 3. The magnet 411 is, for example, fixed to the spool shaft 31. Further, it should be noted that the magnet 411 may be fixed to the spool 3. The magnet 411, for example, is cylindrical. The magnet 411 has a plurality of magnetic poles magnetized in a polar anisotropic manner. The magnetic poles of the magnet 411 are alternately arranged in the circumferential direction.

Each coil 412, for example, is connected in series to each other. The coils 412 are tubular.

The coils 412 are arranged radially outward of the magnet 411. The coils 412 and the magnet 411 are arranged at intervals from each other. The coils 412 are rotatably relative to the magnet 411. The coils 412 are to be attached to the circuit board 36. Further, in order to prevent cogging and to promote smooth rotation of the spool 3, coreless type coils 412 are adopted. Both ends of the plurality of serially connected coils 412 are to be electrically connected to the switch element 413 mounted on the circuit board 36. Each of the coils 412 is curved in an arc shape, and the plurality of coils 412 are arranged at intervals in the circumferential direction, and are formed in a substantially cylindrical shape as a whole. The switch element 413 is configured by, for example, a field-effect transistor.

The brake unit 41 turns on and off the current generated by the relative rotation between the magnet 411 and the coils 412 by the switch element 413, thereby changing the duty cycle and braking the spool 3. The braking force generated by the brake unit 41 becomes stronger as the time of the switch element 413 being on is longer (as the duty cycle D is larger).

As shown in FIG. 5, the switch element 413 is to be connected to the coils 412 via the rectifier circuit 414. Further, the switch element 413 is to be connected to the electric condenser 415. The electric condenser 415 stores electric power generated from the coils 412 at the time of casting. The condenser 415 functions as a power supply for supplying power to the detector 42. In addition, the electric condenser 415 also supplies electric power to the CPU and the like, which may comprise the controller 43. The condenser 415 is configured by, for example, an electrolytic capacitor.

The detector 42 is configured to detect increase and decrease of the rotational speed of spool 3. In other words, detector 42 is configured to detect acceleration of the rotational speed of spool 3. Specifically, detector 42 has speed sensor 421, speed comparator 422, and increase/decrease determiner 423. In addition, speed comparator 422 and increase/decrease determiner 423 in detector 42 can be configured by a CPU as mentioned above.

Speed sensor 421 detects the rotational speed of spool 3 at each scheduled or predetermined time interval. In detail, speed sensor 421 generates an output signal according to the rotational speed of spool 3 at each predetermined time interval. For example, speed sensor 421 comprises a Hall element. Speed sensor 421 is installed on circuit board 36. Speed sensor 421 is located at the position facing the gap of each coil 412. Speed sensor 421 turns off and on according to the predetermined rotational position of magnet 411. Speed sensor 421 outputs the output signal to speed comparator 422.

Speed comparator 422 compares rotational speed of spool 3 detected in speed sensor 421 with the rotational speed of spool 3 detected in speed sensor 421 right beforehand. In other words, speed comparator 422 calculates the rotational speed of spool 3 based on the output signal from speed sensor 421. And speed comparator 422 compares the rotational speed of spool 3 at the end of a predetermined time interval with the rotational speed of spool 3 at the beginning of the predetermined time interval. In addition, detector 42 also has a memory part to memorize or store previous rotational speeds.

Increase/decrease determiner 423 judges increase or decrease of the rotational speed of spool 3 based on the comparison result from speed comparator 422. In detail, increase/decrease determiner 423 judges whether rotational speed of spool 3 has increased or not.

Detector 42 also may have a casting sensor 424. Casting sensor 424 judges whether dual bearing reel 100 has cast or not based on the rotational speed of spool 3 detected by speed sensor 421.

For example, casting sensor 424 judges that dual bearing reel 100 has cast when spool 3 is rotated with a speed which is faster than a predetermined rotational speed in the direction that the dual bearing reel 100 lets out the fishing line. Casting sensor 424 can be configured by CPU mentioned above.

Figure 6:
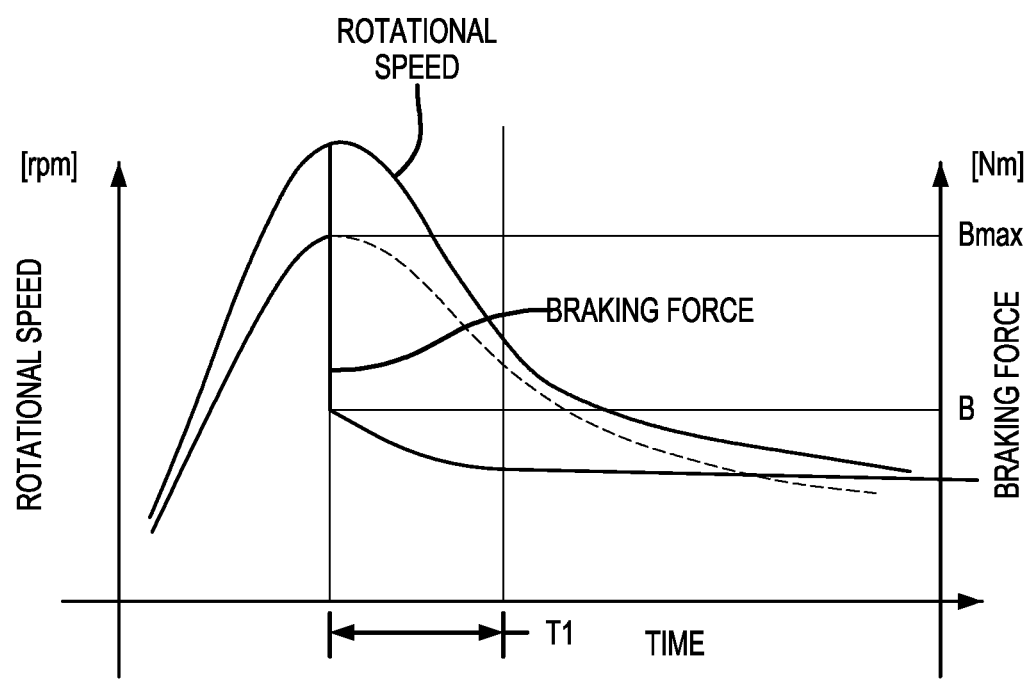
FIG. 6 is a graph showing rotational speed and braking force.

Controller 43 is configured to control the braking force by braking unit 41 based on the increase and decrease of the rotational speed of spool 3 detected by detector 42. In detail, controller 43 controls the braking force by braking unit 41 in the regular braking mode when the rotational speed of spool 3 is increased. In the regular braking mode, controller 43 changes the braking force by braking unit 41 according to the rotational speed of spool 3. In detail, as shown in FIG. 6, controller 43 controls the braking force to increase the braking force according to the increase of the rotational speed in the regular braking mode. In addition, braking force information to show the relationship between rotational speed and braking force in the regular braking mode is set beforehand and is memorized or stored in memory part (not shown in the figure). And based on the braking force information, controller 43 changes braking force by braking unit 41 according to the rotational speed of spool 3.

The controller 43 controls a braking force by the brake unit 41 at the first brake mode for a specified or predetermined time T1 when the increase of the rotational speed of the spool 3 stops. The controller 43 decreases the braking force by the brake part 41 to a lower braking force at the first brake mode than the braking force at the regular (or normal) braking force mode.

In detail, as shown in FIG. 6, in the first braking mode, controller 43 decreases the braking force by braking unit 41 to braking force B when the increase of the rotational speed of spool 3 is stopped. For example, controller 43 decreases the braking force by around 30-40% of B max, which is the maximum braking force in the regular braking mode, to make braking force B. And controller 43 decreases the braking force gradually after decreasing the braking force to the predetermined braking force B. In addition, dotted line in FIG. 6 shows the braking force controlled in the regular braking mode.

Controller 43, for example, controls the braking force in the first braking mode only during predetermined period of time T1, and it controls the braking force by braking unit 41 in the second braking mode after predetermined time T1 passes. In the second braking mode, controller 43 makes the braking force by braking unit 41 smaller than the braking force in the first braking mode. In detail, in the second braking mode, controller 43 controls the braking force by braking unit 41 constantly. In addition, controller 43 decreases the braking force in the second braking mode by 50-60% of braking force B in the first braking mode.

Specifically, as the general maximum braking force is around 8-10 millimeter Nm, for example, when B max, which is the maximum braking force in the regular braking mode is around 8-10 millimeter Nm, braking force B in the first braking mode is around 5-7 millimeter Nm, which is decreased by around 30-40% of B max, which is the maximum braking force in the regular braking mode. In addition, the braking force in the second braking mode is around 2-3 millimeter Nm, which is decreased by around 50-60% of the braking force B in the first braking mode.

Control of braking force B is set beforehand, and it is memorized or stored in controller 43 and the other memory part (not shown in the figure). In addition, the decreased level of the braking force after predetermined braking force B is achieved in the first braking mode is set beforehand, and it is memorized or stored in controller 43 and the other memory mart (not shown in the figure). The controller 43 is able to change the braking force of the brake unit 41, for example, by duty controlling the switch element 413.

Figure 7:
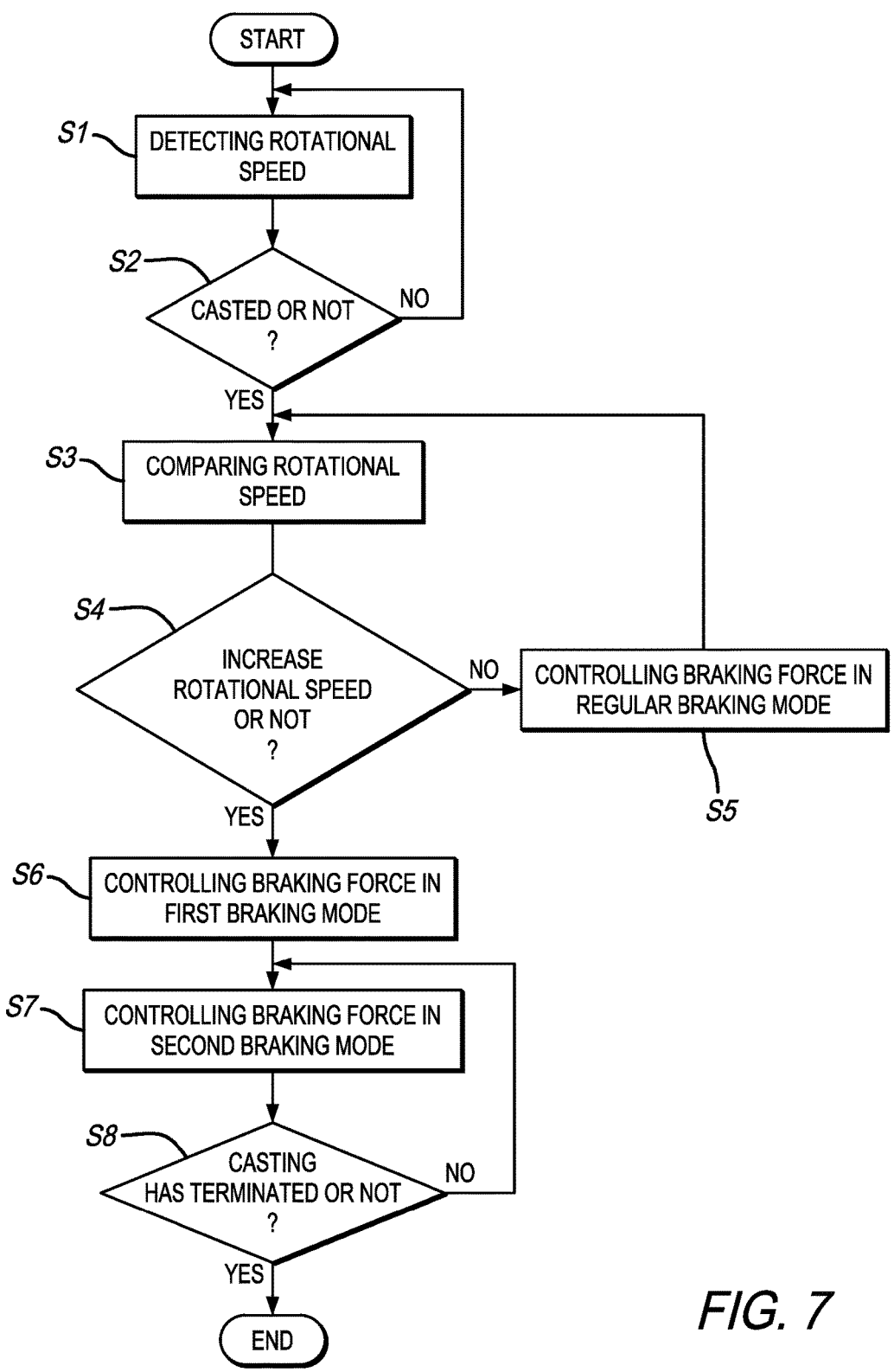
FIG. 7 is a flowchart showing the operation of a spool brake device.

Next, the action of the spool brake device 4 is to be described with reference to FIGS. 6 and 7. The speed sensor 421 detects the rotational speed of the spool 3 at predetermined time intervals (Step S1). The casting sensor 424, based on the rotational speed of the spool 3 detected by the speed sensor 421, is utilized by the controller 43 to determine whether or not the dual bearing reel 100 has been cast (Step S2). In the case where the casting determination unit 424 determines that the dual bearing reel 100 is not cast (No in Step S2), the process of step S1 is repeated again.

On the other hand, after casting sensor 422 judges that dual bearing reel 100 has cast (Yes in Step S2), speed comparator 422 compares the rotational speed of spool 3 detected in speed sensor 421 with the rotational speed of spool 3 detected in speed sensor 421 right beforehand (Step S3). In detail, speed comparator 422 calculates the rotational speed of spool 3 based on the output sign from speed sensor 421, and it stores the calculation results in the memory part. And speed comparator 422 compares the rotational speed of spool 3 at the end of the predetermined time interval with the rotational speed of spool 3 at the beginning of the predetermined time interval.

Next, increase/decrease determiner 423 judges whether the rotational speed of spool 3 has increased or not based on the comparison result by speed comparator 422 (Step S4). When increase/decrease determiner 423 judges that the rotational speed of spool 3 has increased in Step S4 (Yes in Step S4), controller 43 controls braking force by braking unit 41 in the regular braking mode (Step S5). In other words, controller 43 changes the braking force according to the rotational speed. And the process is repeated from Step S3 again.

On the other hand, in Step S4, when increase/decrease determiner 423 judges that the increase of the rotational speed of spool 3 has been stopped (No in Step S4), in other words, when it judges that the device and lure has started to reduce speed because of gravity and air resistance, controller 43 controls braking force by braking unit 41 in the first braking mode (Step S6). In detail, when the increase of the rotational speed of spool 3 is stopped, controller 43 decreases the braking force by braking unit 41 to braking force B, and then it decreases the braking force gradually.

Next, controller 43 turns on the first braking mode and turns off the first braking mode after predetermined time T1 passes, and controls the braking force by braking unit 41 in the second braking mode (Step S7). In addition, braking force in the second braking mode is smaller than braking force in the first braking mode. For example, braking force in the second braking mode is a fixed value.

Next, the casting determination unit 424 determines whether or not the casting has terminated (Step S8). When the casting determination unit 424 determines that the casting has terminated (Yes in Step S8), the spool brake device 4 terminates the braking of the spool 3. Further, for example, when the rotational speed of the spool 3 is less than a predetermined rotational speed, the casting determination unit 424 is to determine that the casting has terminated.

Although the embodiments of the present invention have been described above, the present invention is not limited to these embodiments, and a variety of modifications can be made without departing from the effect of the present invention. For example, the configuration of the brake unit 41 that brakes the spool 3 is not limited to the configuration of the above embodiment, and other configurations may be adopted.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A spool brake device for braking a spool of a dual bearing reel, the spool brake device comprising:
   a brake unit configured to brake the spool;
   a detector configured to detect increase and decrease of a rotational speed of the spool; and
   a controller configured to control a braking force of the brake unit,
   wherein the braking force is controlled by the controller based on a detected increase or decrease of the rotational speed of the spool such that when the rotational speed of the spool is detected to be increasing, the controller sets the braking force according to a regular braking mode, and when the rotational speed of the spool is detected to stop increasing, the controller sets the braking force according to a first braking mode, wherein the braking force of the first braking mode is less than the braking force of the regular braking mode.

2. The spool brake device of claim 1 wherein the braking force of the regular breaking mode is about 8-10 millimeter Nm.

3. The spool brake device of claim 1 wherein the controller is configured to set the braking force to the first braking mode for a predetermined period of time.

4. The spool brake device of claim 3 wherein after the predetermine period of time has elapsed, the controller is configured to set the braking force according to a second braking mode, wherein the braking force of the second braking mode is less than the braking force of the first braking mode.

5. The spool brake device of claim 4 wherein the braking force of the second braking mode is about 50% to about 60% less than the braking force of the first braking mode.

6. The spool brake device of claim 1 wherein the braking force of the first braking mode is about 30% to about 40% less than the braking force of the regular braking mode.

7. The spool brake device of claim 3 wherein the controller is configured to decrease the braking force gradually after the braking force has been set to the first braking mode.

8. The spool brake device of claim 1 wherein the brake unit comprises:
   a magnet configured to rotate integrally with the spool;
   a plurality of coils arranged radially outward relative to the magnet; and
   a switch element electrically coupled to the plurality of coils.

9. The spool brake device of claim 8 wherein the switch element is coupled to the plurality of coils via a rectifier circuit.

10. The spool brake device of claim 8 wherein the switch element further comprises a field-effect transistor.

11. The spool brake device of claim 8 wherein the switch element is electrically coupled to an electric storage element.

12. The spool brake device of claim 1 wherein the controller is configured to control the braking force in the regular braking mode in relation to the rotational speed of the spool, and wherein the controller is configured to control the braking force in the first braking mode in a manner unrelated to the rotational speed of the spool.

13. The spool brake device of claim 1 wherein the detector further comprises:
   a speed sensor configured to detect the rotational speed of the spool;
   a speed comparator configured to compare the rotational speed of the spool at time intervals; and
   an increase/decrease determinator configured to determine if the rotational speed of the spool has increased or decreased between time intervals.

14. The spool brake device of claim 13 wherein the speed sensor further comprises a hall element.

15. The spool brake device of claim 13 wherein the increase/decrease determinator further comprises a casting sensor configured to determine whether the dual bearing reel has cast based on the rotational speed of the spool.

16. A dual bearing reel comprising:
   a reel body;
   a spool coupled to the reel body;
   a handle coupled to the reel body; and
   a spool brake device comprising:
     a brake unit configured to electrically brake a spool of the spool brake device;
     a detector configured to detect increase and decrease of the rotational speed of the spool; and
     a controller configured to control a braking force of the brake unit,
     wherein the braking force is controlled by the controller based on a detected increase or decrease of the rotational speed of the spool such that when the rotational speed of the spool is detected to be increasing, the controller sets the braking force according to a regular braking mode, and when the rotational speed of the spool is detected to stop increasing, the controller sets the braking force according to a first braking mode, wherein the braking force of the first braking mode is less than the braking force of the regular braking mode.

* * * * *